June 1, 1965   G. W. FREEMAN   3,186,123
LINE-END TACKLE FOR FISHING
Filed April 8, 1963   3 Sheets-Sheet 1

June 1, 1965  G. W. FREEMAN  3,186,123
LINE-END TACKLE FOR FISHING
Filed April 8, 1963  3 Sheets-Sheet 2

United States Patent Office
3,186,123
Patented June 1, 1965

3,186,123
LINE-END TACKLE FOR FISHING
George William Freeman, Fen Fringes, Baston, near Peterborough, England
Filed Apr. 8, 1963, Ser. No. 271,321
Claims priority, application Great Britain, Apr. 18, 1962, 14,969/62
2 Claims. (Cl. 43—42.1)

This invention appertains to line-end tackle for fishing, and has reference particularly to such tackle of the kind wherein a barbed fish hook or hooks has or have associated therewith an artificial bait or lure adapted to be drawn along in water through the medium of a line.

One object of this invention is to provide a new or improved form of artificial bait or lure having certain advantages, as will be hereinafter described.

Another object is to provide a complete line-end tackle including such a bait or lure.

Yet another aim of the invention is to provide a simple, efficient and relatively inexpensive device adapted for use in facilitating assembly of the said line-end tackle.

Broadly considered an artificial bait or lure according to this invention consists of a hollow, thin-walled body in the nature of a flexible and resilient container or envelope adapted to encase and conceal a fish hook or hooks, the said hollow body being suitably got up to represent a live and edible aquatic creature or the like designed to be attractive to fish to be caught.

In accordance with a feature of the invention, the new or improved artificial bait or lure may itself be got up to represent a small fish having a tapered or pointed nose, a spatulate tail and one or more fins.

Merely for convenience of description in this specification it will be assumed that the bait or lure is generally of this particular form without, however, any limitation in this respect.

In any event, the idea is that not only will the barbed fish hook or hooks be completely concealed from the fish to be lured, but the accommodating hollow body, having a smooth and more or less stream-lined exterior surface, will effectively prevent fouling of the hook or hooks in rough water and weeds, or/and obstruction by stones or other objects on a water bed.

The new or improved bait or lure may, in fact, be made in any suitable form and of any appropriate flexible and resilient material, and may be coloured and/or otherwise got up in a variety of different ways. Moreover, these artificial baits or lures may be made in various sizes.

Figure 1:
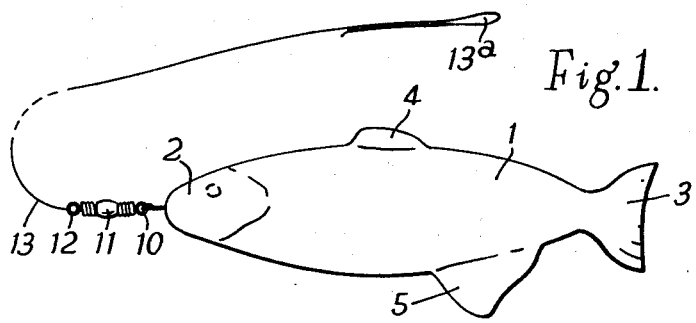
Figure 2:
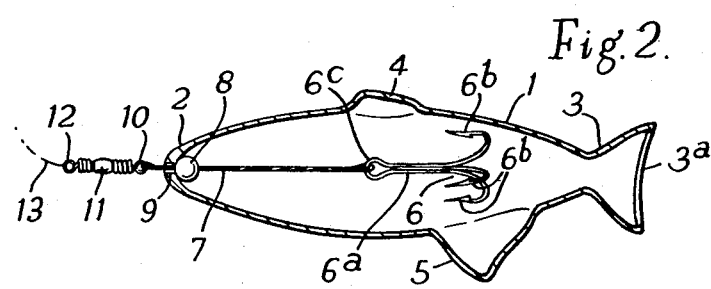
Figure 3:
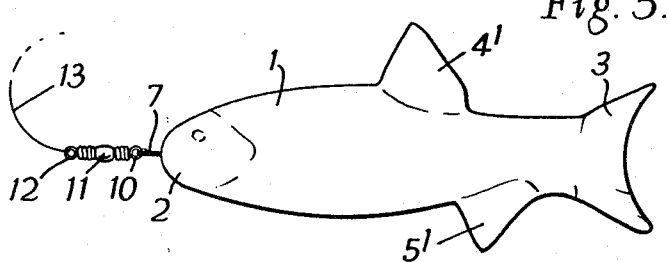
Figure 4:
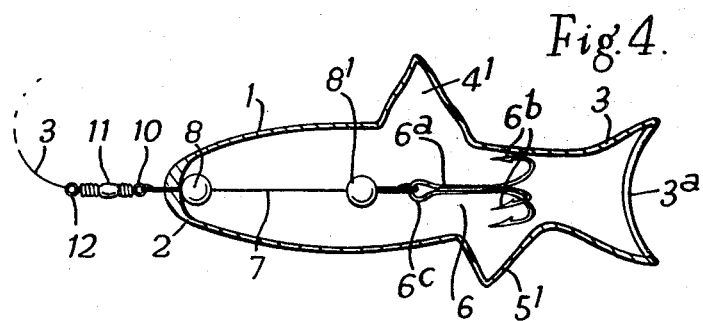
Figure 5:
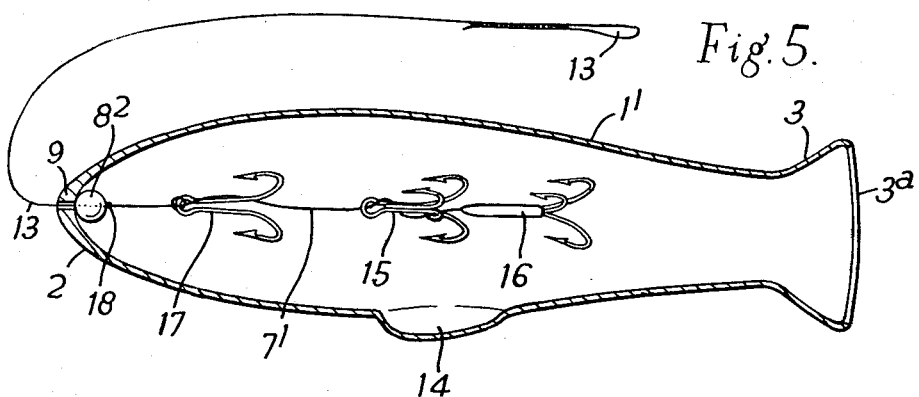
Figure 6:
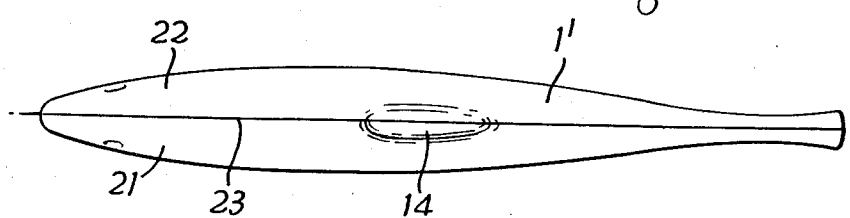
Figure 7:
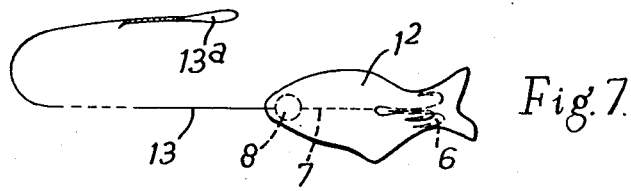
Figure 8:
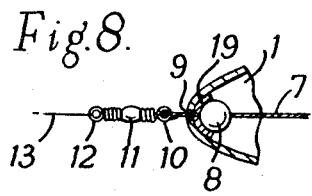
Figure 9:
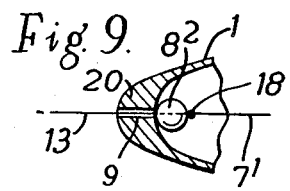
Figure 10:
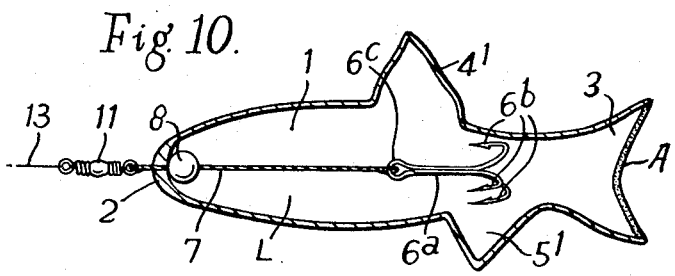
Figure 11:
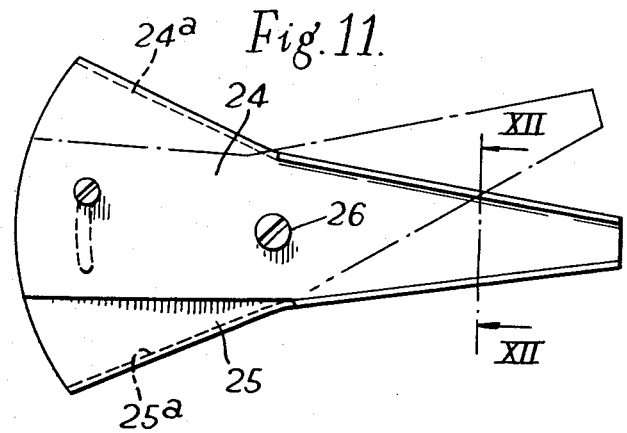

In order that the invention may be more clearly understood and readily carried into practical effect, specific examples of the new or improved form of artificial bait or lure, and a device for facilitating assembly thereof will now be described with reference to the accompanying drawings, wherein, FIGURE 1 is one simple form of bait or lure which represents a small fish and conceals a single fish hook, FIGURE 2 is a longitudinal sectional view of the same, FIGURES 3 and 4 are two views similar to FIGURES 1 and 2 respectively illustrating another form of represented fish concealing a modified arrangement of line-end tackle, FIGURE 5 is a longitudinal sectional view of another form of bait or lure concealing a plurality of longitudinally trailing fish hooks, FIGURE 6 depicts a hollow and flexible bait or lure body moulded in two initially separate but united halves, FIGURE 7 shows a midget version of the new or improved bait or lure, FIGURE 8 is a detail sectional view illustrating the use of a small washer in the nose end of a represented fish, FIGURE 9 is a further and similar detail sectional view depicting the manner in which the nose of a represented fish may be thickened, FIGURE 10 is a longitudinal sectional view of yet another form of the bait or lure hereinafter to be described, FIGURE 11 is an elevational view of a device for expanding the constructed rear end of the hollow body of a represented fish, and for guiding the trace or the cast and the trailing fish-hook or hooks into this body.

Figure 12:
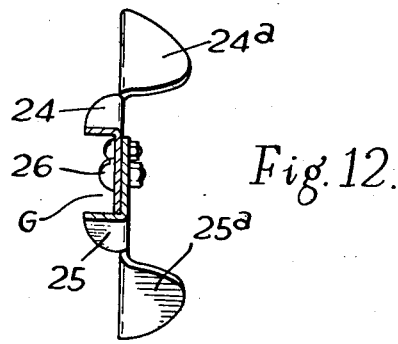
Figure 13:
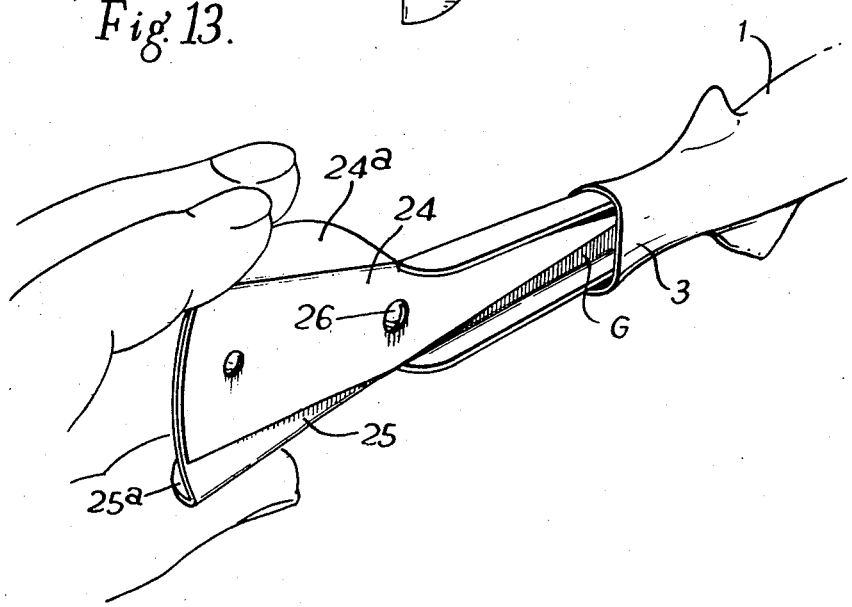

FIGURE 12 is a cross-sectional view of this device taken on the line XII—XII of FIGURE 11, and FIGURE 13 is a perspective view illustrating the manner of use of the said device.

Like parts are designated by similar reference characters throughout the drawings.

Referring to FIGURES 1 and 2 it will be seen that the illustrated artificial bait or lure comprises a hollow thin-walled container or envelope 1 of a flexible and resilient nature which is made to represent a fish having a tapered or pointed nose 2, a spatulate tail 3 and fins such as 4 and 5. Accommodated, encased and wholly concealed within this hollow body 1, which has a smooth and streamlined exterior surface, is a barbed fish hook 6 (FIGURE 2). The said hook may be of any suitable form known to anglers; for instance, it may be a hook known as a Limerick, a Kirby, a Carlisle, a Kendal Sneck Bent, a Sproat or an Aberdeen. The barbed fish hook 6 in the particular illustrated example now being described has, as will be seen in FIGURE 2 a shank 6a and three appropriately curved barbed portions 6b. Fastened to an eye 6c formed in the leading end of the shank 6a is a short trace 7 which, at its forward end, has threaded on to and secured to it a centrally bored small solid element 8 of approximately spherical form, or it may be annular. This element 8 and the barbed fish hook 6 are inserted into the hollow body 1 of the fish through the rear end 3a of its spatulate tail 3 which is left open for this purpose, whereupon the leading extremity of the trace 7 is threaded through a small hole 9 provided in the pointed nose 2 of the fish. Thereafter, the said leading extremity of the trace 7 is fastened to one eye 10 of a small swivel coupling 11, the other eye 12 of which has secured to it the inner end of a thin wire or like cast 13 for attachment to a line. By pulling on the cast 13 the small solid element 8 is caused to be pulled tightly into the nose 2. If desired, and as shown in FIGURE 1, the outer end of the cast 13 can finally be formed and secured in the form of a loop 13a whereby the tackle can be readily attached to the end of a line. Alternatively, a line could, if necessary, be attached directly to the eye 12 of the swivel coupling 11.

The artificial bait or lure depicted in FIGURES 3 and 4 is somewhat similar to that just described with reference to FIGURES 1 and 2. The only differences, in fact, are firstly that the hollow body 1 is made to represent a different variety of fish having fins 4' and 5', and secondly that a second small solid element 8' is associated with the trace 7.

The somewhat larger artificial bait or lure illustrated in FIGURE 5 comprises a commensurately larger hollow body 1' having a single fin 14, the body in this case concealing three barbed and longitudinally trailing fish hooks, viz. two triple-barbed hooks 15 and 16 and one double-barbed hook 17 all connected together by a trace 7'. The length of wire constituting the trace 7' is in this example continued through a small bead-like element $8^2$ to provide the cast 13 for attachment to a line. Thus, in this example, it is the cast 13 which is threaded through the small hole 9 formed in the pointed nose of the fish. Before the leading end of the cast 13 is inserted into the hollow representation of a fish it has the bead-like element 8² threaded onto it. This element is then pushed right up to the knot 18 formed in the wire to define the leading end of the trace 7'. By pulling on the cast 13 after it has been threaded through the hole 9 in the nose, the small, solid element 8² is caused to be pulled tightly into the latter.

FIGURE 7 merely shows that it is possible to conceal a single fish hook, such as 6, into a hollow body 1² representing a "tiddler."

If desired, and as shown in FIGURE 8, a small washer 19 of any suitable material may be threaded on to the trace 7 or on to the cast and interposed between the spherical or annular solid element such as 8 and the interior surface of the nose 2 of the body 1.

Moreover, and as shown in FIGURE 9, the nose 2 of the fish may conveniently be thickened as at 20 or/and suitably reinforced to prevent the hook or hooks from being pulled forwardly out of the bait or lure when this is being dragged through water and weeds.

Instead of the tail end 3 of the bait or lure being left open, as indicated at 3a in each of FIGURES 2, 4 and 5, the appropriate surfaces of the tail may, if desired, be capable of being rendered adherent or tacky (shown as A in FIG. 10) so that they can be secured together to close and seal the rear opening 3a. This would enable the hollow bait or lure either to be filled with a liquid (see L in FIGURE 10), prior to sealing or to be inflated with air. If, as may be, the bait or lure is filled with water or with any suitable scented liquid it can be used as a weight. It is considered that the employment of scent, oils or perfume in this way will excite the olefactory senses of the fish to be caught and so provide further attraction. An inflated bait or lure, on the other hand, can be floated.

It is principally the intention that the hollow body of the new or improved artificial bait or lure shall be moulded, e.g. by the blow moulding, compression moulding, slush moulding or rotational moulding technique, in rubber or in any appropriate rubber-like material. Thus, for instance, an elastomer may be employed, i.e. a synthetic polymer with rubber-like characteristics such as butyl rubber, polyurethene rubber or silicone rubber. Depending on which of the available moulding processes is adopted, the hollow body of the bait or lure may be made wholly in one piece, or it may be initially moulded in two separate longitudinal halves which are subsequently united along a median line. This last mentioned feature is depicted in FIGURE 6 wherein it will be seen that the two halves 21 and 22 of the hollow body 1' are united along a median line 23. The body illustrated in FIGURE 6 corresponds with that shown in FIGURE 5.

The hollow, thin walled, flexible and resilient container or envelope constituting the body of the artificial bait or lure may be realistically coloured, for example by painting, in one or more colours contrived to simulate the life-like appearance of any desired small fish. An aluminium or silver paint artistically applied, in conjunction with another or other colours, can create a particularly realistic glistening effect calculated to lure a fish to the bait.

As will be appreciated, whenever a caught fish draws in the bait or lure the barbs will penetrate the thin wall of rubber or rubbery material and so hook into the flesh of the fish. But when disengaged from the caught fish the hook or hooks can be readily re-accommodated wholly within the bait or lure, the rubber or rubbery material thereupon re-forming to close the one or more punctures made.

Now in a bait or lure of fish form there is a substantial constriction at the location where the body 1 and the inner end of the spatulate tail 3 adjoin. This constriction naturally tends to make the initial insertion of the hook or hooks into the hollow body of the fish difficult—especially as some considerable temporary expansion of the rubber or rubbery material in this region is essential during this operation.

Accordingly, a further aspect of this invention resides in the provision of a simple device which, by insertion into the open rear end 3a of the tail 3 and appropriate manipulation, not only serves to expand the constriction but also to provide, within the fish, a guide of sufficient dimensions to permit of the free passage into the hollow body of the trace or the cast and the trailing fish hook or hooks. Thus, by subsequent removal of the device from the bait or lure the expanded portion contracts and the hook or hooks are fully enclosed and concealed.

As shown in FIGURES 11, 12 and 13 such a device may conveniently comprise a pair of tapered members 24 and 25 of angle form in cross-section (see FIGURE 12), these members being pivoted together at a point 26 intermediate their ends and being formed at their widest ends with finger-pieces 24a and 25a whereby the members may be actuated scissor-fashion. The formation and arrangement of these members, however, is such that when the finger-pieces 24a and 25a are moved outwardly apart from one another, the operative narrow ends of the device are closed together as depicted in full lines in FIGURE 11, and vice versa. As will be appreciated, the angle form members 24 and 25 together provide a channel-shaped guide G which, with the narrow ends of the members closed together, can be inserted right into the constricted portion of the hollow bait or lure. After such an insertion, the finger-pieces 24a and 25a are pressed inwardly and thus closed together suchwise as to open out the narrow ends and consequently expand the constriction and widen the guide G to the extent necessary to enable the trace or cast and the hook or hooks to be passed freely into the hollow body 1 all as clearly illustrated in FIGURE 13.

It is to be clearly understood, however, that it is not essential that the tackle should be inserted into the hollow body 1 through a constricted tail opening 3a; it could, for example, be alternatively inserted through an open fin or through any other appropriately located opening.

I claim:

1. In line-end tackle for fishing, an artificial bait comprising a hollow, thin-walled body which is moulded in a resilient and flexible material, said body being in the shape of a fish having a tapered nose, a spatulate tail and at least one fin, at least one barbed fish hook which has a shank, a thin wire attached to said shank and a small bored solid element threaded onto and affixed to said thin wire, means defining an opening in said body, said opening being provided for the insertion of said fish hook and shank therethrough, means defining a hole in said body positioned in said nose for the insertion of said thin wire attached to said shank, said small bored solid element being drawn toward the wall of said nose defining said hole, said nose being thickened or reinforced to prevent pulling of said fish hook and shank through said hole, and said opening being located in the end of said spatulate tail and being defined by the two sides of said spatulate tail, the inside surfaces of said sides of said spatulate tail having an adhesive medium for sealing said opening to prevent liquid or air from passing therethrough, whereby said fish hook and shank is encased within said body and said fish-hook may be readily removed and replaced by any fish hook desired and whereby any body of said shape may be used.

2. An artificial bait according to claim 1 wherein said bait further comprises a swivel cast extending from said thin wire and attached at one end thereto outside said body, said swivel cast having its free end formed for ready attachment to a line.

(References on following page)

References Cited by the Examiner

UNITED STATES PATENTS

| | | | |
|---|---|---|---|
| 779,744 | 1/05 | Shakespeare | 43—42.1 |
| 1,110,956 | 9/14 | McBride | 43—42.1 |
| 1,278,146 | 9/18 | Henthorn | 43—41 |
| 1,816,725 | 7/31 | Freeman | 43—41 |
| 2,016,960 | 10/35 | Dillon | 43—42.1 |
| 2,027,069 | 1/36 | Soreson | 43—42.1 X |
| 2,129,245 | 9/38 | Stenstrom | 43—42.39 X |
| 2,332,400 | 10/43 | Richardson | 43—42.1 |
| 2,556,702 | 6/51 | Nielsen | 43—42.1 X |
| 2,600,673 | 6/52 | Murray | 43—42.1 |
| 2,741,864 | 4/56 | Shotton | 43—42.39 |

FOREIGN PATENTS

| | | |
|---|---|---|
| 22,561 | 6/48 | Finland. |
| 1,248,602 | 11/60 | France. |

SAMUEL KOREN, *Primary Examiner.*